(12) United States Patent
Xu

(10) Patent No.: US 8,897,143 B2
(45) Date of Patent: *Nov. 25, 2014

(54) METHOD AND DEVICE FOR MONITORING MCCH NOTIFICATION INFORMATION, AND USER EQUIPMENT

(75) Inventor: Hui Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 177 days.

This patent is subject to a terminal disclaimer.

(21) Appl. No.: 13/258,305

(22) PCT Filed: Jun. 13, 2010

(86) PCT No.: PCT/CN2010/073984
§ 371 (c)(1),
(2), (4) Date: May 7, 2012

(87) PCT Pub. No.: WO2011/097856
PCT Pub. Date: Aug. 18, 2011

(65) Prior Publication Data
US 2012/0263043 A1 Oct. 18, 2012

(30) Foreign Application Priority Data
Feb. 11, 2010 (CN) .......................... 2010 1 0111929

(51) Int. Cl.
*H04L 12/26* (2006.01)
*H04W 72/00* (2009.01)
(52) U.S. Cl.
CPC .................................. *H04W 72/005* (2013.01)
USPC ........... 370/241; 370/252; 370/253; 370/312; 370/320; 370/328; 455/3.01; 455/3.05; 455/404.1; 455/434; 455/522
(58) Field of Classification Search
CPC .................................................. H04W 72/005
USPC ......... 370/241, 252, 253, 311, 312, 319, 320, 370/328; 455/3.01–3.05, 404.1, 434, 522
See application file for complete search history.

(56) References Cited

U.S. PATENT DOCUMENTS 7,463,891 B2 * 12/2008 Yi et al. ........................ 455/450
7,499,435 B2    3/2009 Kwak et al.
(Continued)

FOREIGN PATENT DOCUMENTS

CN    101044529 A    9/2007
CN    101262626 A    9/2008
(Continued)

OTHER PUBLICATIONS

International Search Report in international application No. PCT/CN2010/073984, mailed on Nov. 18, 2010.
English Translation of the Written Opinion of the International Search Authority in international application No. PCT/CN2010/073984, mailed on Nov. 18, 2010.
(Continued)

*Primary Examiner* — Andrew Lai
*Assistant Examiner* — Andrew C Lee
(74) *Attorney, Agent, or Firm* — Oppedahl Patents Law Firm LLC

(57) ABSTRACT

The present invention discloses a method for monitoring Multicast Control Channel (MCCH) notification information, comprising: in a Multicast-Broadcast Single Frequency Network (MBSFN) cell that includes more than two MCCHs, when user equipment (UE) determines that the required MBMS service is not started, the UE further determines whether there is a correspondence relationship between the required MBMS service and the MCCHs, if yes, the UE just monitors the notification information of the MCCH corresponding to the required MBMS service; otherwise, the UE monitors the notification information of all the MCCHs in the MBSFN cell. The invention also discloses a device for monitoring MCCH notification information and user equipment. The present invention guarantees that the UE can timely receive an MBMS service that is not started currently in a cell with overlapped MBSFN areas.

10 Claims, 6 Drawing Sheets

(56) References Cited

U.S. PATENT DOCUMENTS

| | | | |
|---|---|---|---|
| 7,499,455 B2* | 3/2009 | Lee et al. | 370/395.5 |
| 7,565,138 B2* | 7/2009 | Kim et al. | 455/414.3 |
| 7,912,471 B2* | 3/2011 | Kodikara Patabandi et al. | 455/450 |
| 7,924,760 B2 | 4/2011 | Ding et al. | |
| 8,000,292 B2* | 8/2011 | Cai et al. | 370/329 |
| 8,064,942 B2 | 11/2011 | Yang et al. | |
| 8,077,649 B2 | 12/2011 | Cai | |
| 8,139,524 B2* | 3/2012 | Lee et al. | 370/328 |
| 8,155,648 B2 | 4/2012 | Lee et al. | |
| 8,159,997 B2* | 4/2012 | Fukunaga et al. | 370/321 |
| 8,223,689 B2* | 7/2012 | Fischer | 370/328 |
| 8,228,852 B2* | 7/2012 | Yi et al. | 370/329 |
| 8,260,292 B2* | 9/2012 | Fischer | 455/434 |
| 8,265,039 B2* | 9/2012 | Reza et al. | 370/332 |
| 8,351,974 B2 | 1/2013 | Ahn et al. | |
| 8,363,585 B2 | 1/2013 | Bouazizi | |
| 8,369,286 B2 | 2/2013 | Hamabe et al. | |
| 2004/0185837 A1* | 9/2004 | Kim et al. | 455/414.3 |
| 2006/0030342 A1 | 2/2006 | Hwang et al. | |
| 2006/0067281 A1* | 3/2006 | Kwak et al. | 370/337 |
| 2006/0072534 A1* | 4/2006 | Jokinen et al. | 370/346 |
| 2008/0049682 A1 | 2/2008 | Ding et al. | |
| 2008/0212546 A1* | 9/2008 | Fischer | 370/338 |
| 2008/0233974 A1* | 9/2008 | Xu | 455/458 |
| 2008/0268878 A1* | 10/2008 | Wang et al. | 455/458 |
| 2008/0274759 A1* | 11/2008 | Chen et al. | 455/507 |
| 2008/0311949 A1* | 12/2008 | Koskinen et al. | 455/525 |
| 2009/0046617 A1 | 2/2009 | Tenny et al. | |
| 2009/0122740 A1* | 5/2009 | Bouazizi | 370/312 |
| 2009/0238091 A1* | 9/2009 | Kim et al. | 370/252 |
| 2009/0264064 A1 | 10/2009 | Hyun et al. | |
| 2009/0323574 A1 | 12/2009 | Koskinen et al. | |
| 2010/0128646 A1* | 5/2010 | Gao | 370/312 |
| 2010/0128648 A1* | 5/2010 | Lee et al. | 370/312 |
| 2010/0159933 A1* | 6/2010 | Kim et al. | 455/436 |
| 2010/0174809 A1 | 7/2010 | Chun et al. | |
| 2010/0178895 A1* | 7/2010 | Maeda et al. | 455/404.1 |
| 2010/0189027 A1* | 7/2010 | Ishida et al. | 370/312 |
| 2010/0214972 A1* | 8/2010 | Che et al. | 370/315 |

FOREIGN PATENT DOCUMENTS

| | | |
|---|---|---|
| CN | 101552950 A | 10/2009 |
| WO | 2006030290 A2 | 3/2006 |
| WO | 2006036050 A1 | 4/2006 |
| WO | 2008035880 A1 | 3/2008 |
| WO | 2008114883 A1 | 9/2008 |

OTHER PUBLICATIONS

Evolved Universal Terrestrial Radio Access (E-UTRA) and Evolved Universal Terrestrial Radio Access Network (E-UTRAN), 3GPP TS 36.300 V8.5.0; May 31, 2008. (134 pages—see International Search Report in international application No. PCT/CN2010/073980 for relevant pages).

CATT: "The MCCH Reception of LTE R9 UE in Overlapping Areas", 3GPP Draft; R2-093700_The MCCH reception of LTE R9 UE in overlapping areas, 3rd Generation Partnership Project (3GPP), Mobile Competence Centre; 650, Route des Lucioles; F-06921 Sophia-Antipolis Cedex; France, no. Los Angeles, USA; Jun. 23, 2009. (2 pages—see Supplementary European Search Report in European application No. 10845527.0 for relevant pages).

"E-mail discussion on multiple MBSFN support (67#31)", 3GPP Draft; R2-095906 Report of email discussion on MBMS multiple MBSFN support 67#31_final, 3rd Generation Partnership Project (3GPP), Mobile Competence Centre; 650, Route des Lucioles; F-06921 Sophia-Antipolis Cedex; France, vol. RAN WG2, no. Miyazaki; Oct. 5, 2009. (9 pages—see Supplementary European Search Report in European application No. 10845527.0 for relevant pages).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP Standard; 3GPP TS 36.300, 3rd Generation Partnership Project (3GPP), Mobile Competence Centre; 650, Route des Lucioles; F-06921 Sophia-Antipolis Cedex; France; Jan. 7, 2010. (178 pages—see Supplementary European Search Report in European app. No. 10845527.0 for relevant pages).

Supplementary European Search Report in European application No. 10845527.0, mailed on Dec. 18, 2012. (8 pages—see entire document).

International Search Report in international application No. PCT/CN2010/073980, mailed on Nov. 18, 2010. (4 pages—see entire document).

English Translation of the Written Opinion of the International Search Authority in international application No. PCT/CN20101/073980, mailed on Nov. 18, 2010. (4 pages—see entire document).

R2-094507 (Notification mechanism for multiple MCCHs) Aug. 28, 2009.

ZTE, "Draft CR for MBMS Notification", 3GPP TSG-WG2 Meeting #68bis, R2-100322, Jan. 18, 2010. (5 pages).

LG Electronics Inc., "E-mail discussion on multiple MBSFN support (67#31)", 3GPP TSG-RAN WG2 #67bis, R2-095906, Oct. 16, 2009. (12 pages).

* cited by examiner

METHOD AND DEVICE FOR MONITORING MCCH NOTIFICATION INFORMATION, AND USER EQUIPMENT

TECHNICAL FIELD

The present invention relates to the technology for monitoring a Multimedia Broadcast Multicast Service (MBMS) control channel, in particular to a method and a device for monitoring Multicast Control Channel (MCCH) notification information in a Long Term Evolution (LTE) system, and to user equipment.

BACKGROUND

In order to utilize mobile network resources effectively, the 3rd Generation Partnership Project (3GPP) proposes MBMS which is a point-to-multipoint service that a data source is provided in a mobile network to send data to multiple users, thus the share of network resources is realized, and the utilization rate of network resources, particularly the utilization rate of precious air interface resources is increased. In an LTE network, the MBMS technology is called evolved MBMS (E-MBMS).

In an existing LTE network, a logical channel of an MBMS service is a Multicast Traffic Channel (MTCH), each MTCH corresponding to one session of the MBMS service. Multiple MTCHs can be mapped to a same transmission channel Multicast Channel (MCH), one or more MCHs can be mapped to a same Physical Multicast Channel (PMCH), and one PMCH is composed of a group of Multicast Broadcast Single Frequency Network (MBSFN) sub-frames.

In the existing LTE network, the concept of MBSFN area is introduced. In an MBSFN area, an MBMS service is sent by means of MBSFN, and different cells in a same MBSFN area adopt same resources, contents and time to send a same physical signal synchronously, so as to realize diversity reception gain of a receiving terminal. One or more PMCHs can be configured in an MBSFN area, one PMCH can bear one or more MCHs, and preferably one PMCH bears one MCH channel. In the LTE network, to notify user equipment (UE) of information that a certain MBMS service is going to change, the changes possibly being a session start, a service bearing update or a session stop and so on, Downlink Control Information (DCI) and MBMS-Radio Network Temporary Identifier (M-RNTI) may be sent on a Physical Downlink Control Channel (PDCCH). The UE further reads specific Multicast Control Channel (MCCH) information according to relative information in the DCI, this process is called an MCCH notification mechanism. In the existing 3GPP Release 9 technology, system information block 13 (SIB13) shows a resource configuration of MCCH notification information, including MCCH notification repetition coefficient (notification Repetition Coeff), notification frame offset (notification Offset) and notification subframe location (notification-subframe).

The logical channel MCCH is a multicast control channel, and the MCCH bears configuration information of each MCH/PMCH in an MBSFN area, including the MBSFN subframe configuration, modulation coding solution and so on configured by each PMCH channel. In the prior art, the MCCH corresponds to the MBSFN area one-to-one.

The MCCH also bears configuration information of a service, including a service ID, a session ID, a status, a Logical Channel ID (LCID) and so on. After obtaining information of a specific service by receiving the MCCH, the UE starts to receive data of the service on an MTCH. The configuration information of the MCCH is sent on a Broadcast Control Channel (BCCH) by means of a system message. If there are multiple MCCHs, each MCCH corresponds to a group of configuration information in a broadcast message.

When the UE enters an MBSFN cell, the UE will read information of the BCCH and the MCCH to obtain configuration information of MBMS services in the target cell, and then receive a required service on the MTCH. In the prior art, when the UE enters the MBSFN cell, the UE will read all the MCCHs in the cell and finds whether the MBMS service required to be received is started; if the MBMS service required by the UE is not started, the UE will monitor MCCH notification information. When the MCCH notification information (MCCH change notification) is detected, it is indicated that the MCCH will change in the next MCCH modification cycle, in the prior art, the MCCH notification information is only for a session start event, that is, only the session start event will trigger the system side to send the MCCH notification information.

During the research and practice of the prior art, it is found that the prior art has the following problems: in the solution of the prior art, if a cell belongs to multiple MBSFN areas, that is, multiple MBSFN areas have an overlapped area, then there are multiple MCCHs in the cell and each MCCH corresponds to one MBSFN area; UE enters the MBSFN cell, reads a BCCH, Electronic Service Guide (ESG) and an MCCH, and finds that a required MBMS service is not started; or the UE does not receive an MBMS service in the MBSFN area, after a period of time (it may be one or more MCCH modification cycles, during which the UE will not read MCCH information), the UE wants to receive an MBMS service, and it determines that the MBMS service required to be received is not started according to the ESG and stored MCCH information; in above two cases, the UE monitors MCCH notification information. If the UE does not know a correspondence relationship between the MBMS service and the MCCHs, it monitors notification information of all the MCCHs, but it is unable to determine a specific changed MBMS service according to the notification information, therefore the UE needs to read information of all the changed MCCHs, which will increase the power consumption of the UE having the capability of receiving an MBMS service in the overlapped MBSFN area. If the MBMS service required to be received is started, the UE will be unable to receive the required MCCH notification information, thus it will be unable to receive a required MBMS service.

SUMMARY

Therefore, the purpose of the present invention is to provide a method and a device for monitoring MCCH notification information, and user equipment, to monitor MCCH notification information of an MBMS service which is required by the UE and not started, so as to accurately receive the MBMS service required by the UE in time.

In order to achieve above purpose, the technical solution of the invention is realized as follows:

a method for monitoring MCCH notification information is provided, comprising:

in a Multicast Broadcast Single Frequency Network (MBSFN) cell that includes more than two MCCHs, when user equipment (UE) determines that a required MBMS service is not started, further determining by the UE whether there is a correspondence relationship between the required MBMS service and the MCCHs, if there is, only monitoring notification information of an MCCH corresponding to the required MBMS service; otherwise, monitoring notification information of all the MCCHs in the MBSFN cell.

Preferably, when the UE determines that there is a correspondence relationship between the required MBMS service and the MCCHs, the method may further comprise:

when the UE determines that the MCCH changes according to the notification information of the monitored MCCH, reading information in the changed MCCH and obtaining configuration information of the required MBMS service.

Preferably, when the UE determines that there is no correspondence relationship between the required MBMS service and the MCCHs, the method may further comprise:

when the UE determines that an MCCH changes according to the notification information of the monitored MCCHs, reading information in the changed MCCH, and determining whether the required MBMS service is included, if it is included, obtaining configuration information of the required MBMS service.

Preferably, the MBSFN cell may include more than two MCCHs, that is to say, the MBSFN cell may be located in an area where more than two MBSFN areas are overlapped.

Preferably, the UE determining whether there is a correspondence relationship between the required MBMS service and the MCCHs may be:

the UE obtains a correspondence relationship between an MBMS service and the MCCHs according to at least one of received ESG, MCCH information, short message, multimedia message, system message, radio resource control (RRC) information and MCCH notification information, and further determines whether the required MBMS service has a corresponding MCCH.

Preferably, the UE determining that an MCCH changes according to the notification information of the monitored MCCH may be:

the UE detects MCCH notification information on an MBSFN subframe indicated by a system message and determines that when contents of downlink control information (DCI) of the MCCH notification information change, the MCCH corresponding to the MCCH notification information changes.

Preferably, the UE may be the one that is in RRC_IDLE status or RRC_CONNECTED status; the UE may be the one that is receiving an MBMS service or the one that is interested in receiving an MBMS service.

A device for monitoring MCCH notification information is provided, comprising: a first determining unit, a first monitoring unit and a second monitoring unit, wherein:

the first determining unit is adapted to, in an MBSFN cell that includes more than two MCCHs, when determining that the MBMS service required by the UE is not started, further determine whether there is a correspondence relationship between the required MBMS service and the MCCHs, if there is, trigger the first monitoring unit, otherwise, trigger the second monitoring unit;

the first monitoring unit is adapted to only monitor notification information of an MCCH corresponding to the required MBMS service;

the second monitoring unit is adapted to monitor notification information of all the MCCHs in the MBSFN cell.

Preferably, the device may further comprise a second determining unit, a first reading unit and a first obtaining unit, wherein:

the second determining unit is adapted to trigger the first reading unit when determining that the MCCH changes according to the notification information of the MCCH monitored by the first monitoring unit;

the first reading unit is adapted to read information in the changed MCCH;

the first obtaining unit is adapted to obtain configuration information of the required MBMS service from the information in the changed MCCH.

Preferably, the device may further comprise a third determining unit, a second reading unit, a fourth determining unit and a second obtaining unit, wherein:

the third determining unit is adapted to trigger the second reading unit when determining that an MCCH changes according to notification information of the MCCHs monitored by the second monitoring unit;

the second reading unit is adapted to read information in the changed MCCH;

the fourth determining unit is adapted to determine whether the required MBMS service is included in the information in the changed MCCHs, if it is included, trigger the second obtaining unit;

the second obtaining unit is adapted to obtain configuration information of the required MBMS service.

Preferably, the MBSFN cell may include more than two MCCHs, that is to say, the MBSFN cell is located in an area where more than two MBSFN areas are overlapped.

Preferably, the first determining unit may obtain the correspondence relationship between an MBMS service and the MCCHs according to at least one of ESG, MCCH information, short message, multimedia message, system message, RRC information and MCCH notification information received by the UE, and further determine whether the required MBMS service has a corresponding MCCH.

Preferably, the second determining unit or the third determining unit may detect MCCH notification information on an MBSFN subframe indicated by a system message and determine that when contents of DCI of the MCCH notification information change, the MCCH corresponding to the MCCH notification information changes.

User equipment having the capability of receiving MBMS information is provided, it comprises the monitoring device described above.

In the present invention, in an MBSFN cell that includes more than two MCCHs, when an MBMS service required by UE is not started, the UE determines whether a correspondence relationship between the required MBMS service and the MCCHs is determined, if it is determined, the UE only monitors the notification information of the MCCH corresponding to the required MBMS service, otherwise, the UE monitors the notification information of all the MCCHs in the MBSFN cell; the corresponding MCCH information is read according to the result of monitoring of the MCCH notification information, to obtain the configuration information of the MBMS service required by the UE, so as to finish the reception of the service. The present invention guarantees that the UE can receive an MBMS service that is not started currently in time in a cell with overlapped MBSFN areas.

DETAILED DESCRIPTION OF THE INVENTION

Figure 1:
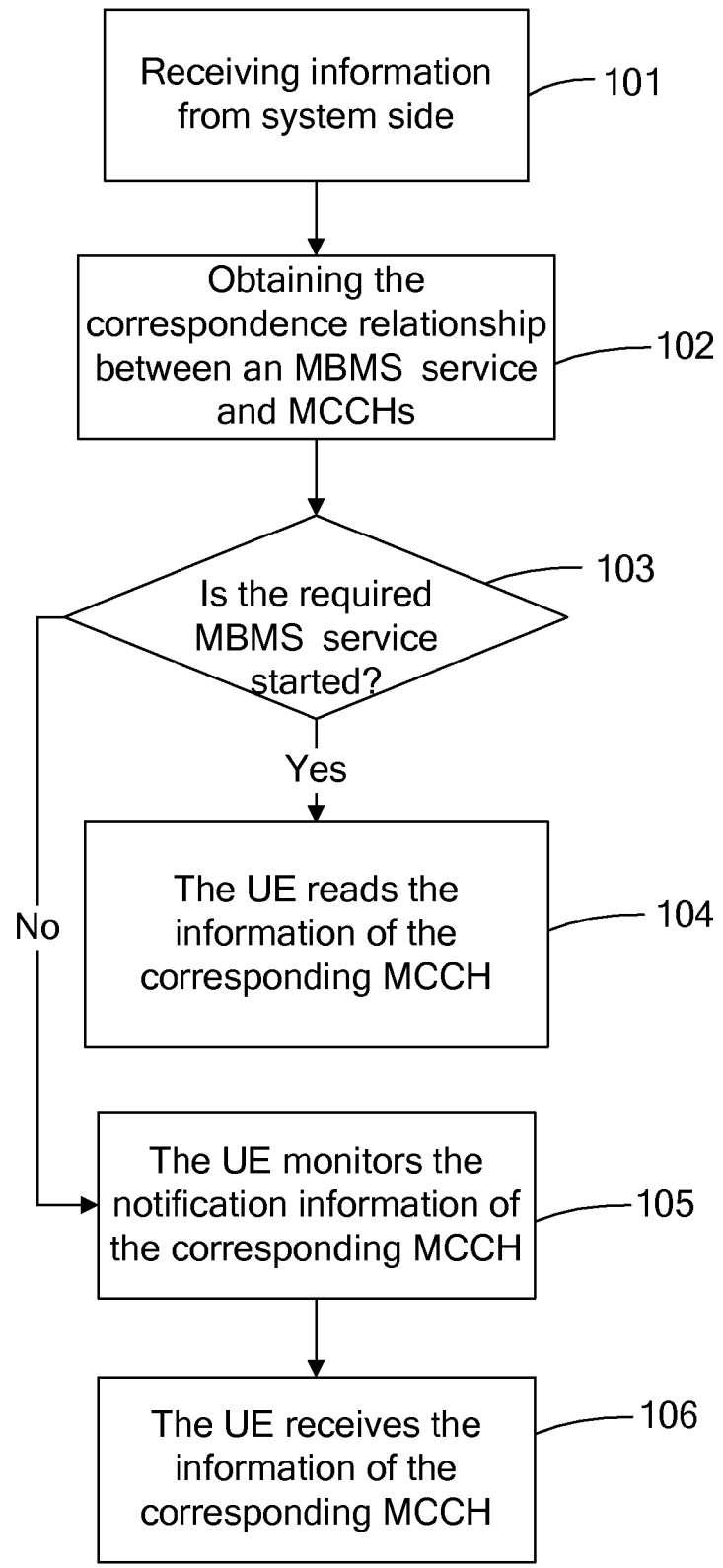
FIG. 1 shows a flow chart of a method for monitoring MCCH notification information according to Embodiment 1 of the present invention.

The basic idea of the present invention is: in an MBSFN cell that includes more than two MCCHs, when an MBMS service required by UE is not started, the UE determines whether a correspondence relationship between the required MBMS service and the MCCHs is determined, if it is determined, the UE only monitors notification information of an MCCH corresponding to the required MBMS service; otherwise, the UE monitors notification information of all the MCCHs in the MBSFN cell; the corresponding MCCH information is read according to the result of monitoring of MCCH notification information, so that configuration information of the MBMS service required by the UE is obtained and the service is received.

To make the purpose, technical solution and advantages of the present invention more clear, the present invention will be further described in details below with reference to drawings in conjunction with embodiments.

The present invention provides a method for monitoring MCCH notification information by UE according to a currently required MBMS service in an overlapped MBSFN area, to guarantee that the UE can receive the MBMS service normally in the overlapped MBSFN area.

When one cell is covered by more than two MBSFNs, a network side may configure a corresponding MCCH for each MBSFN area in the cell; one MCCH corresponds to one MBSFN area, bears configuration information of an MBMS service sent in the corresponding MBSFN area, and sends configuration information of MCCH notification information in a system message.

The method of the present invention further comprises the following steps.

Step 1: The system side sends relative MBMS information in the overlapped MBSFN area;

Step 2: The UE receives the relative MBMS information, determines that an MBMS service required to be received (a required MBMS) is not started, and further determines whether a correspondence relationship between the MBMS service required to be received and the MCCHs is included currently, if it is included, the UE monitors notification information of an MCCH corresponding to the required MBMS service; otherwise, the UE monitors notification information of all the MCCHs in the cell.

In the Step 1, a device for sending the relative MBMS information to the UE may be a Broadcast Multicast Service Centre (BM-SC), a Mobility Management Entity (MME), a MBMS-Gate Way (MBMS-GW), a Multicast Coordination Entity (MCE), a base station (eNB) or other network elements; wherein, the MCE is a logic entity and can exist independently or as a part of other network elements, for example, as a part of an eNB. The base station may be a relay or home eNodeB (HeNB).

The overlapped MBSFN area is a static area, that is, the MBSFN area is semi-statically configured through Operation & Management (O&M) and remains unchanged during the sending process of an MBMS service, or, the overlapped MBSFN area is a dynamic MBSFN area; and the overlapped area may be partially overlapped or completely overlapped. The MBSFN area can be indicated by an MBSFN area ID.

The relative MBMS information in the Step 1 can be sent to the UE by at least one of the following messages: ESG, MCCH information, a short message, a multimedia message, a system message and RRC information; the relative MBMS information may be sent periodically and also based on event triggering, for example, the relative MBMS information is sent when it changes; the sending cycle is notified to the UE by a system message. The relative MBMS information includes but not limited to one or more of the following contents: ID of an MBMS service in the cell, a correspondence relationship between the MBMS service and MCCHs, status of the MBMS service in the cell, start time of the MBMS service in the cell, duration of the MBMS service in the cell, stop time of the MBMS service in the cell, priority information of the MBMS service in the cell, charging information of the MBMS service in the cell, and classification information of the MBMS service in the cell and so on.

The UE in the present invention is the one entering the MBSFN cell and having the capability of receiving an MBMS service; the UE can be in RRC_IDLE status or RRC_CONNECTED status, and the UE can be receiving an MBMS service or be interested in receiving an MBMS service.

The UE determines that the required MBMS service is not started according to the relative MBMS information in the Step 1 and stored MCCH information. Wherein, the MCCH information is relative MBMS information in the MCCH stored after the UE reads the MCCH.

In the Step 2, the step that the UE monitors MCCH notification information means that the UE monitors and reads the MCCH notification information on a PDCCH of an MBSFN subframe and can determine which MCCH changes according to the MCCH notification information;

the step that the UE monitors MCCH notification information corresponding to the required MBMS further comprises: after the UE obtains the required MCCH notification information through monitoring, it continues to read corresponding contents of the changed MCCH, thus obtaining the configuration information of the required MBMS and realize the reception of the required MBMS; after the UE monitors the notification information of all the MCCHs in the MBSFN cell, it continues to read information of all changed MCCHs, determines the configuration information of the required MBMS according to the information of the changed MCCHs, to realize the reception of the required MBMS.

In the present invention, if the UE does not need to receive an MBMS in the MBSFN cell, it does not monitor MCCH notification information.

The essence of the technical solution of the present invention will be further described below through specific examples.

Embodiment 1

The application scene of this example is that there are more than two MCCHs in the MBSFN cell, the UE does not receive any MBMS currently, there is an MBMS required to be received by the UE in the MBSFN cell, and the UE has known a correspondence relationship between the MBMS required to be received and the MCCHs; as shown in FIG. 1, the method for monitoring MCCH notification information in this example comprises the following steps.

Step 101: The UE receives a message related to an MBMS;

said message related to an MBMS may be one or more of the following messages: ESG, MCCH information, short message, multimedia message, system message and RRC information; the reception of the message related to an MBMS may be periodical reception, or in-time reception according to a signaling indication; the message may include but not limited to one or more of the following contents: ID of an MBMS in the cell, a correspondence relationship between the MBMS and the MCCHs, status of the MBMS in the cell, start time of the MBMS in the cell, duration of the MBMS in the cell, stop time of the MBMS in the cell, priority information of the MBMS in the cell, charging information of the MBMS in the cell, and classification information of the MBMS in the cell and so on.

Step 102: The UE obtains a correspondence relationship between an MBMS and the MCCHs;

the correspondence relationship between an MBMS and the MCCHs may be that one MBMS corresponds to multiple MCCHs or one MCCH corresponds to multiple MBMS services.

Step 103: The UE determines whether a required MBMS is started, if it is started, Step 104 is executed, otherwise, Step 105 is executed;

the UE determines whether the required MBMS is started means that the UE determines whether the MBMS is started according to an existing relative message of the MBMS.

Step 104: The UE reads MCCH information corresponding to the required MBMS;

the UE reads MCCH information means that the UE receives MCCH information on a corresponding MBSFN subframe according to an indication of a system message; the MCCH information includes specific MBMS configuration information, such as MBMS configuration information.

Step 105: The UE monitors MCCH notification information corresponding to the MBMS;

the UE determines the MCCH corresponding to the currently required service according to the obtained correspondence relationship between the MBMS and the MCCHs, and monitors the notification information of the MCCH. The UE detects the MCCH notification information on a specified MBSFN subframe according to an indication of a system message, and can determine the changed MCCH according to the MCCH notification information; the detection of the MCCH notification information means blind detection of DCI information and M-RNTI value of the MCCH notification information on the PDCCH. The MCCH corresponding to the MCCH notification information changes when it is determined that contents of the DCI of the MCCH notification information change.

Step 106: The UE further reads the MCCH information according to the MCCH notification information;

the UE further reads the MCCH information means that the UE finds that the required MCCH changes according to the notification information, the UE receives the MCCH information on the corresponding MBSFN subframe according to an indication of a system message; the MCCH information includes specific MBMS configuration information, based on which the UE can receive the required MBMS.

Embodiment 2

Figure 2:
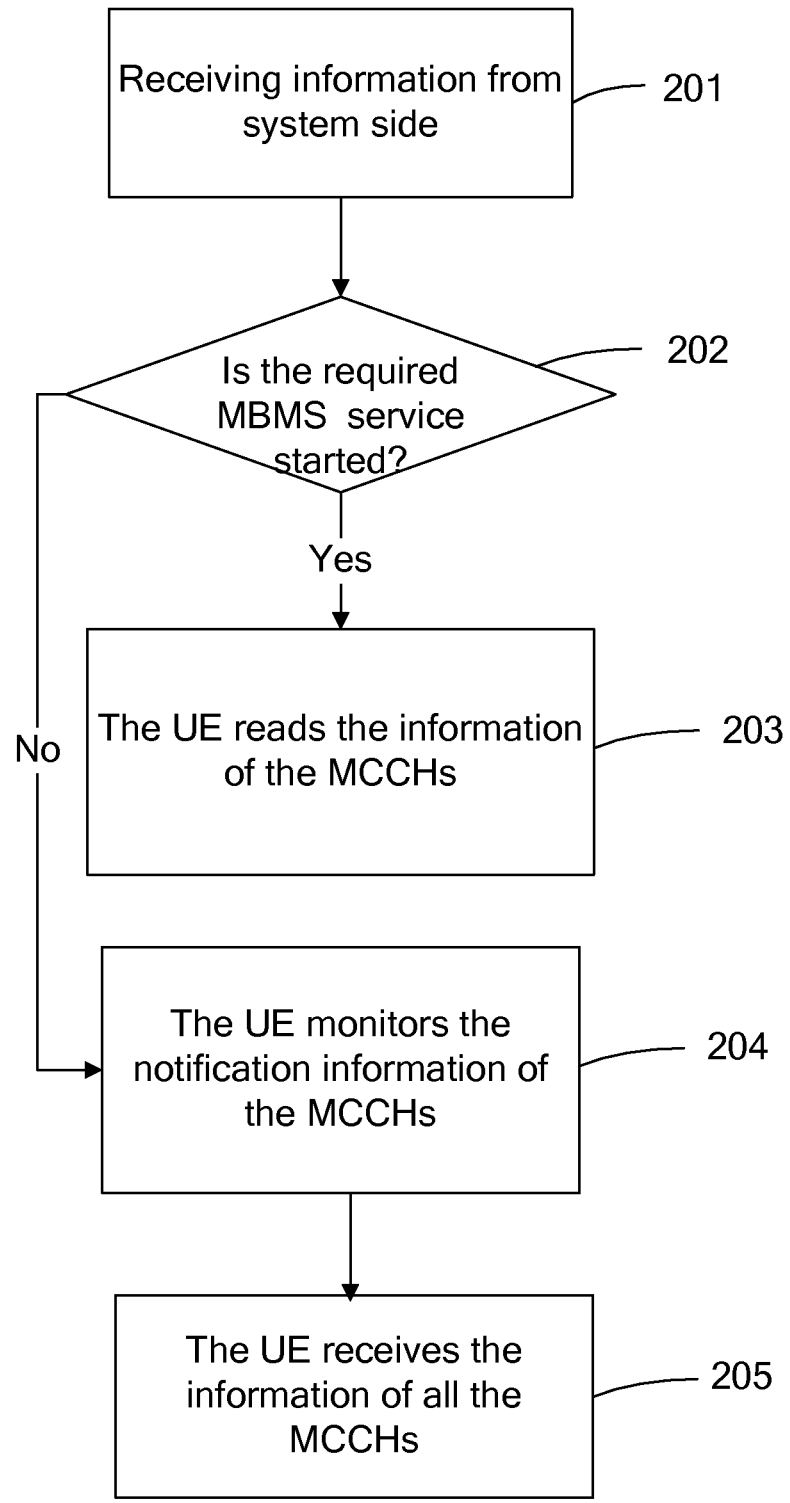
FIG. 2 shows a flow chart of the method for monitoring MCCH notification information according to Embodiment 2 of the present invention.

The application scene of this example is that there are more than two MCCHs in the cell, the UE does not receive an MBMS currently, there is an MBMS required to be received by the UE in the cell, and the UE does not know a correspondence relationship between the MBMS required to be received and the MCCHs; as shown in FIG. 2, the method for monitoring MCCH notification information in this example comprises the following steps.

Step 201: The UE receives a message related to an MBMS; this step is the same as Step 101.

Step 202: The UE determines whether a required MBMS is started, if it is started, Step 203 is executed, otherwise, Step 204 is executed.

Step 203: The UE reads information of all the MCCHs in the cell;

as the UE does not obtain a correspondence relationship between the required MBMS and the MCCHs, it has to read information of all the MCCHs in the cell;

the reading MCCH information means that the UE receives MCCH information on a corresponding MBSFN subframe according to an indication of a system message; the MCCH information includes MBMS configuration information.

Step 204: The UE monitors notification information of all the MCCHs in the cell;

as the UE does not obtain the correspondence relationship between the required MBMS and the MCCHs, it has to read the notification information of all the MCCHs in the cell;

the UE detects MCCH notification information on a specified MBSFN subframe according to an indication of a system message, and determines a changed MCCH according to the MCCH notification information; the detection of MCCH notification information means blind detection of DCI information and M-RNTI value of the MCCH notification information on a PDCCH. An MCCH corresponding to the MCCH notification information changes when it is determined that the DCI contents of the MCCH notification information change.

Step 205: The UE further reads MCCH information according to the MCCH notification information;

the UE further reads MCCH information means that the UE finds that there is an MCCH changed in the cell according to the notification information, the UE receives the MCCH information on a corresponding MBSFN subframe according to an indication of a system message; the reading an MCCH means reading all the changed MCCHs in the cell; the MCCH information includes MBMS configuration information. Based on the information of all the changed MCCHs, the relative information of the required MBMS can be determined and found, such that the required MBMS can be received.

Embodiment 3

Figure 3:
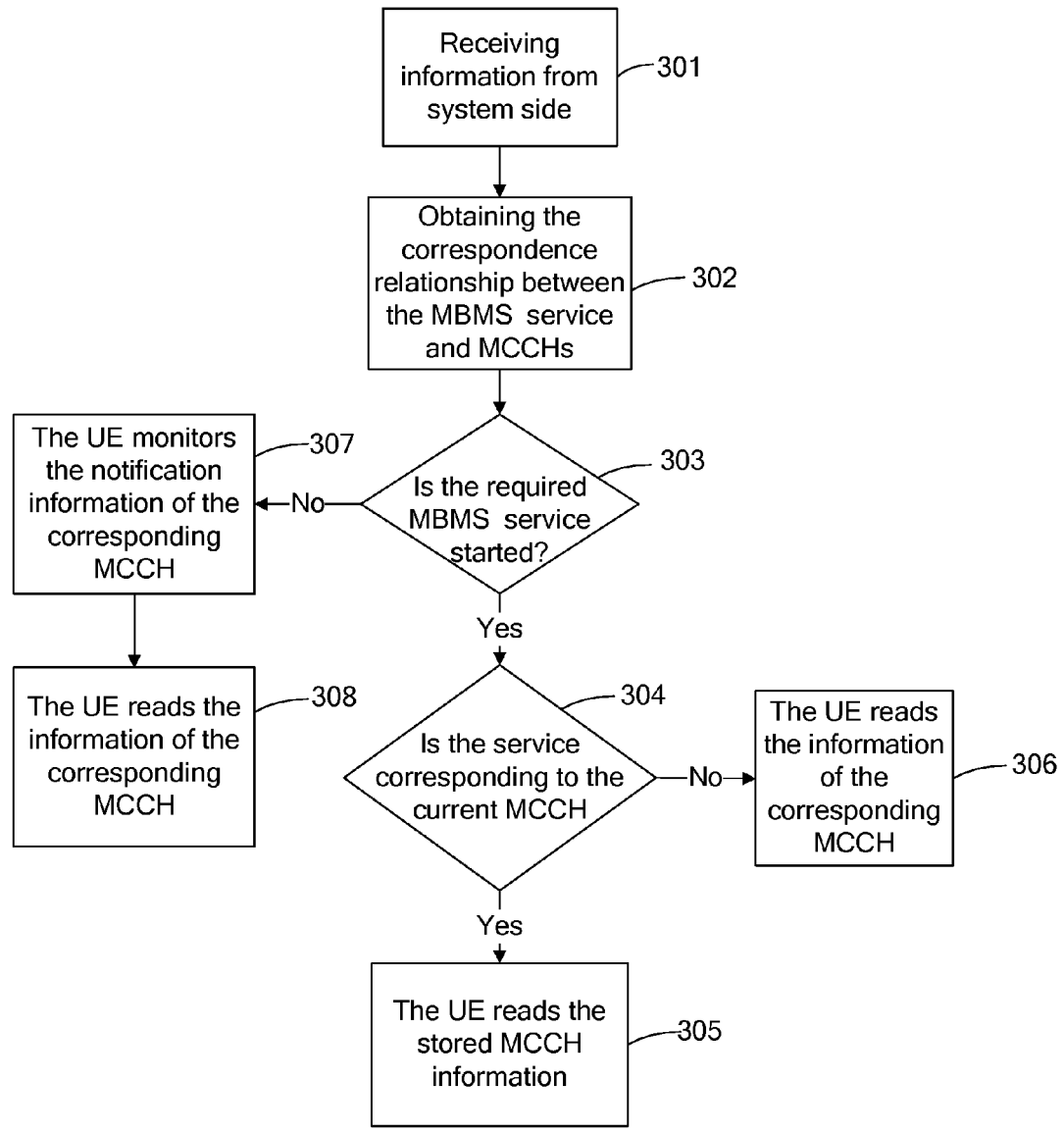
FIG. 3 shows a flow chart of the method for monitoring MCCH notification information according to Embodiment 3 of the invention.

The application scene of this example is that there are more than two MCCHs in the cell, the UE is receiving an MBMS, there are other MBMS services required to be received by the UE in the cell, and the UE has known a correspondence relationship between an MBMS and the MCCHs; as shown in FIG. 3, the method for monitoring MCCH notification information in this example comprises the following steps.

Step 301: The UE receives a message related to an MBMS; this step is the same as Step 101.

Step 302: The UE obtains a correspondence relationship between an MBMS and the MCCHs;

this step is the same as Step 102.

Step 303: The UE also wants to access other MBMS services, and further determines whether a required MBMS is started, if it is started, Step 304 is executed, otherwise, Step 307 is executed;

said other MBMS services means the ones required by the UE in the cell except the MBMS being received by the UE; the UE determining whether the required MBMS is started means that the UE determines whether the MBMS is started according to the existing relative message of the MBMS.

Step 304: The UE determines whether an MCCH corresponding to the required MBMS is the MCCH corresponding to the MBMS that is being received by the UE, if it is, Step 305 is executed, otherwise, Step 306 is executed.

Step 305: The UE reads stored MCCH information;

the stored MCCH information is relative information of all the MBMS services in the MCCH corresponding to the MBMS that is being received by the UE; the stored MCCH information is the MCCH information that is stored in the local UE within a same MCCH modification cycle.

Step 306: The UE reads information of the MCCH corresponding to the required MBMS;

the UE determines the MCCH corresponding to the required MBMS according to the correspondence relationship between an MBMS and the MCCHs.

Step 307: The UE monitors MCCH notification information corresponding to an MBMS;

the monitoring by the UE means the UE detects MCCH notification information on a specified MBSFN subframe according to an indication of a system message, and determines a changed MCCH according to the MCCH notification information; the detection of MCCH notification information means blind detection of DCI information and M-RNTI value of the MCCH notification information on a PDCCH. An MCCH corresponding to the MCCH notification information changes when it is determined that the DCI contents of the MCCH notification information change.

Step 308: The UE further reads MCCH information according to the MCCH notification information;

the UE further reads MCCH information means that the UE finds that the required MCCH changes according to the notification information, the UE receives the MCCH information on a corresponding MBSFN subframe according to an indication of a system message; the MCCH information includes specific MBMS configuration information. The UE can receive the required MBMS according to the information.

Embodiment 4

Figure 4:
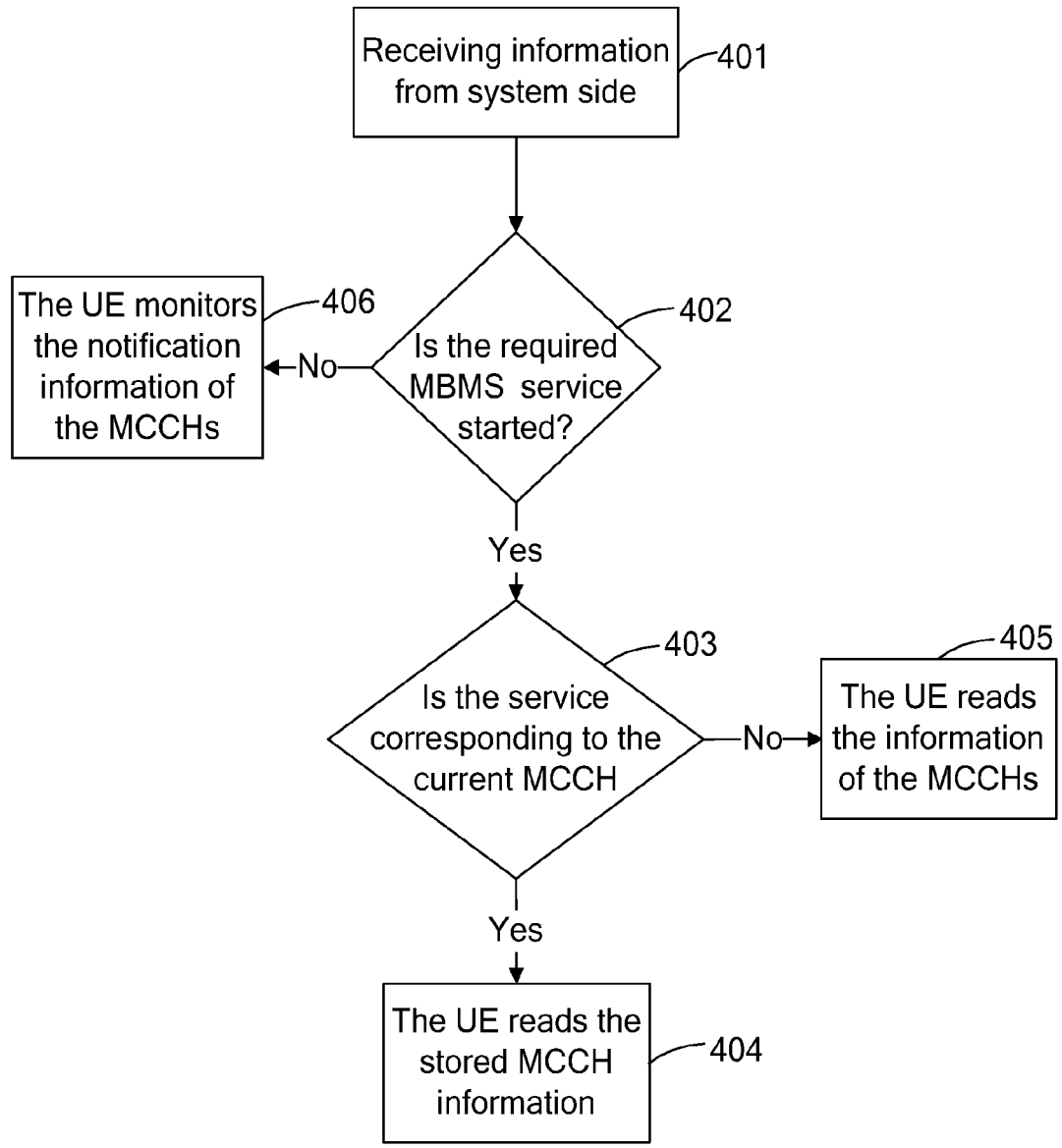
FIG. 4 shows a flow chart of the method for monitoring MCCH notification information according to Embodiment 4 of the invention.

The application scene of this example is that there are more than two MCCHs in the cell, the UE is receiving an MBMS, there are other MBMS services required to be received by the UE in the cell, and the UE does not know a correspondence relationship between an MBMS and the MCCHs; as shown in FIG. 4, the method for monitoring MCCH notification information in this example comprises the following steps.

Step 401: The UE receives a message related to an MBMS; this step is the same as Step 101.

Step 402: The UE determines whether a required MBMS is started, if it is started, Step 403 is executed, otherwise, Step 406 is executed;

the UE determining whether the required MBMS is started means that the UE determines whether the MBMS is started according to existing relative messages of MBMS services.

Step 403: The UE determines whether an MCCH corresponding to the required MBMS is the MCCH corresponding to the MBMS that is being received by the UE, if it is, Step 404 is executed, otherwise, Step 405 is executed.

Step 404: The UE reads stored MCCH information;

the stored MCCH information is the information of the MCCH corresponding to the MBMS that is being received by the UE; the stored MCCH information is the MCCH information that is stored in the local UE within a same MCCH modification cycle.

Step 405: The UE reads information of other MCCHs in the cell;

other MCCHs means MCCHs except the MCCH corresponding to the MBMS that is being received by the UE.

Step 406: The UE monitors notification information of all the MCCHs in the cell;

the monitoring by the UE means that the UE detects MCCH notification information on a specified MBSFN subframe according to an indication of a system message, and determines a changed MCCH according to the MCCH notification information; the detection of MCCH notification information means blind detection of DCI information and M-RNTI value of the MCCH notification information on a PDCCH. An MCCH corresponding to the MCCH notification information changes when it is determined that the DCI contents of the MCCH notification information change.

Step 407: The UE further reads MCCH information according to the MCCH notification information;

the UE further reads MCCH information means that the UE finds that the required MCCH changes according to the notification information, the UE receives the MCCH information on a corresponding MBSFN subframe according to an indication of a system message; the MCCH information includes specific MBMS configuration information.

Application examples will be given below for further understanding of the flows in the embodiments.

Figure 5:
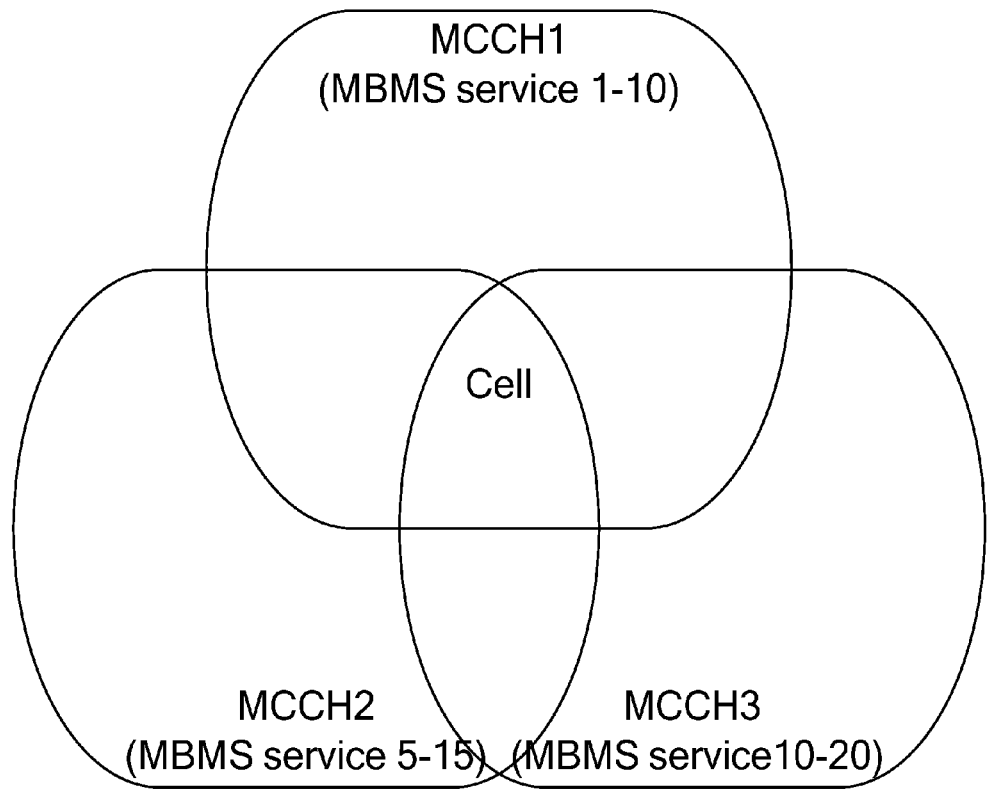
FIG. 5 shows a schematic diagram of a specific application example of the present invention.

FIG. 5 shows a diagram of a specific application example of the present invention. It is assumed that there are three overlapped MBSFN areas, respectively corresponding to MCCH1, MCCH2 and MCCH3, wherein, the MCCH1 corresponds to MBMS services numbered from 1 to 10, the MCCH2 corresponds to MBMS services numbered from 5 to 15, and the MCCH3 corresponds to MBMS services numbered from 10 to 20.

Corresponding to Embodiment 1, it is assumed that UE having the capability of receiving an MBMS enters the cell, the UE has known that the cell can provide MBMS services 1-20 and the UE has known an MCCH to which each MBMS corresponds. The UE wants to receive MBMS1, as the MBMS1 corresponds to the MCCH1, if the MBMS1 is not started, the UE monitors notification information of the MCCH1; if the MBMS1 has been started, the UE directly reads information of the MCCH1; if the MBMS1 is to be started, the system side sends notification information on the notification occasion, the UE detects the notification information of the MCCH1, and reads the information of the MCCH1 at the next MCCH1 modification cycle, to obtain relative information of the MBMS1.

Corresponding to Embodiment 2, it is assumed that UE having the capability of receiving an MBMS enters the cell, the UE has known that the cell can provide MBMS services 1-20, but the UE does not know an MCCH to which each MBMS corresponds. The UE wants to receive MBMS1, if the MBMS1 is not started, as the UE does not know an MCCH corresponding to the MBMS1, the UE monitors notification information of all the MCCHs in the cell; if the MBMS1 is to be started, the system side sends notification information on the notification occasion, the UE detects notification information of the MCCH1, and reads information of the MCCH1 at the next MCCH1 modification cycle to obtain relative information of the MBMS1. When any MBMS in the cell is to be started, the sending of notification information of a corresponding MCCH will be triggered, the UE monitors the notification information of the MCCH, continues to read the information of the MCCH at the next MCCH modification cycle to obtain MBMS information. If the MBMS1 has been started, the UE directly reads the information of the MCCH1.

Corresponding to Embodiment 3, it is assumed that UE having the capability of receiving an MBMS enters the cell, the UE has known that the cell can provide MBMS services 1-20 and the UE has known an MCCH to which each MBMS corresponds. The UE is receiving MBMS1, if the UE also wants to receive MBMS2, as both the MBMS1 and MBMS2 correspond to the MCCH1, the UE reads the MCCH1 periodically during reception of the MBMS1, so the UE does not need to monitor notification information of the MCCH1; if the UE also wants to receive MBMS16, as the MBMS16 corresponds to the MCCH3, if the MBMS16 is not started, the UE monitors notification information of the MCCH3. When the MBMS16 is to be started, the system side sends notification information on the notification occasion; the UE detects the notification information of the MCCH3, and reads information of the MCCH3 at the next MCCH3 modification cycle, to obtain relative information of the MBMS16. If the MBMS16 has been started, the UE directly reads the information of the MCCH3.

Corresponding to Embodiment 4, it is assumed that UE having the capability of receiving an MBMS enters the cell, the UE has known that the cell can provide MBMS services 1-20, but the UE does not know an MCCH to which each MBMS corresponds. The UE is receiving MBMS1, if the UE also wants to receive MBMS2 and if the MBMS2 is not started, the UE monitors notification information of all the MCCHs in the cell because it does not know the MCCH corresponding to the MBMS service 2. If the MBMS service 2 is to be started, the system side sends notification information on the notification occasion, the UE detects notification information of the MCCH1, and reads information of the MCCH1 at the next MCCH1 modification cycle to obtain relative information of the MBMS service 2. When any MBMS service in the cell is to be started, the sending of notification information of a corresponding MCCH will be triggered, the UE monitors the notification information of the MCCH, continues to read the information of the MCCH at the next MCCH modification cycle to obtain MBMS service information. If the MBMS service 2 has been started, as the UE reads the MCCH1 periodically during reception of the MBMS service 1, the UE can obtain the information of the MCCH corresponding to the MBMS service 2 and it does not need to monitor the notification information of the MCCH1.

Figure 6:
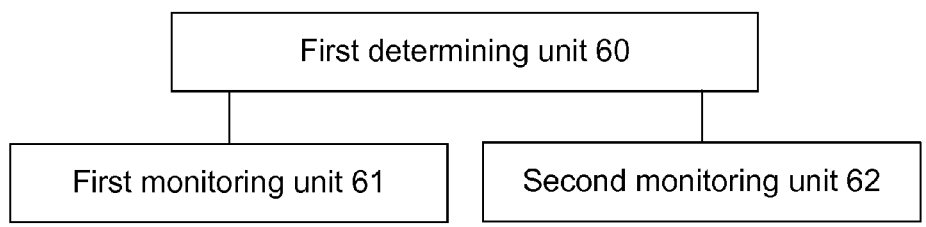
FIG. 6 shows the first composition structure diagram of a device for monitoring MCCH notification information according to the present invention.

FIG. 6 shows the first composition structure diagram of a device for monitoring MCCH notification information according to the present invention, as shown in FIG. 6, the device for monitoring MCCH notification information comprises a first determining unit 60, a first monitoring unit 61 and a second monitoring unit 62, wherein, the first determining unit 60 is adapted to, in an MBSFN cell that includes more than two MCCHs, when determining that an MBMS service required by the UE is not started, further determine whether there is a correspondence relationship between the required MBMS service and the MCCHs, if there is, trigger the first monitoring unit 61, otherwise, trigger the second monitoring unit 62;

the first monitoring unit 61 is adapted to only monitor notification information of the MCCH corresponding to the required MBMS service;

the second monitoring unit 62 is adapted to monitor notification information of all the MCCHs in the MBSFN cell.

Figure 7:
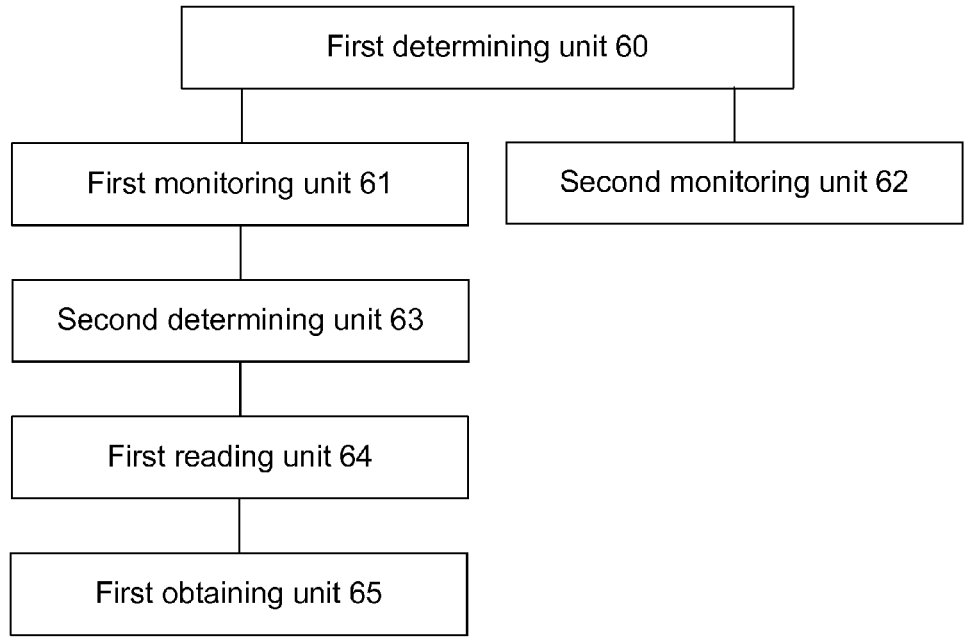
FIG. 7 shows the second composition structure diagram of the device for monitoring MCCH notification information according to the present invention.

FIG. 7 shows the second composition structure diagram of the device for monitoring MCCH notification information according to the present invention, as shown in FIG. 7, based on the device as shown in FIG. 6, the device for monitoring MCCH notification information further comprises a second determining unit 63, a first reading unit 64 and a first obtaining unit 65, wherein, the second determining unit 63 is adapted to trigger the first reading unit 64 when determining that an MCCH changes according to notification information of the MCCH monitored by the first monitoring unit 61;

the first reading unit 64 is adapted to read information in the changed MCCH;

the first obtaining unit 65 is adapted to obtain configuration information of the required MBMS service from the information in the changed MCCH.

Figure 8:
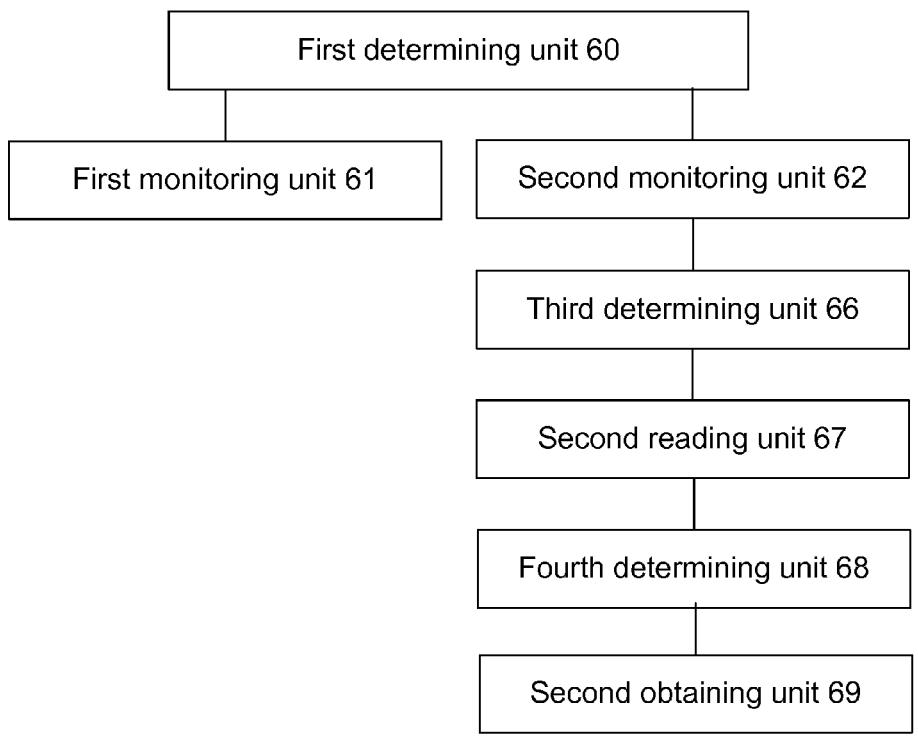
FIG. 8 shows the third composition structure diagram of the device for monitoring MCCH notification information according to the present invention.

FIG. 8 shows the third composition structure diagram of the device for monitoring MCCH notification information according to the present invention, as shown in FIG. 8, based on the device as shown in FIG. 6 or FIG. 7 (herein, the device shown in FIG. 8 is based on the device as shown in FIG. 6), the device for monitoring MCCH notification information further comprises a third determining unit 66, a second reading unit 67, a fourth determining unit 68 and a second obtaining unit 69, wherein, the third determining unit 66 is adapted to trigger the second reading unit 67 when determining that an MCCH changes according to the notification information of the MCCHs monitored by the second monitoring unit;

the second reading unit 67 is adapted to read information in the changed MCCH;

the fourth determining unit 68 is adapted to determine whether the required MBMS service is included in the information in the changed MCCH, if it is included, trigger the second obtaining unit 69;

the second obtaining unit 69 is adapted to obtain configuration information of the required MBMS service.

In the examples of the device, the MBSFN cell includes more than two MCCHs, that is to say, the MBSFN cell is located in an area where more than two MBSFN areas are overlapped.

The first determining unit 60 obtains a correspondence relationship between an MBMS service and MCCHs according to at least one of ESG, MCCH information, short message, multimedia message, system message, RRC information and MCCH notification information received by the UE, and further determines whether the required MBMS service has a corresponding MCCH.

The second determining unit 63 or the third determining unit 66 detects MCCH notification information on an MBSFN subframe indicated by a system message and determines that when contents of DCI of the MCCH notification information change, the MCCH corresponding to the MCCH notification information changes.

It should be understood by the skilled in the art that, the functions of all processing units in the device for monitoring MCCH notification information as shown in FIG. 6, FIG. 7 and FIG. 8 could refer to relative descriptions from Embodiment 1 to Embodiment 4. The functions of all units in the device for monitoring MCCH notification information as shown in FIG. 6, FIG. 7 and FIG. 8 can be realized by programs operated on CPU, and also can be realized by specific logic circuits.

User equipment having the capability of receiving MBMS information is provided, the UE comprises the device for monitoring MCCH notification information as shown in FIG. 6, FIG. 7 and FIG. 8.

The above mentioned only describe the preferred embodiments of the present invention and are not intended to limit the protection scope of the present invention.

The invention claimed is:

1. A method for monitoring Multicast Control Channel (MCCH) notification information, comprising:
   in a Multicast Broadcast Single Frequency Network (MB-SFN) cell that includes more than two MCCHs, when user equipment (UE) determines that a required MBMS service is not started, further determining by the UE whether there is a correspondence relationship between the required MBMS service and the MCCHs, if there is, only monitoring notification information of an MCCH corresponding to the required MBMS service, otherwise, monitoring notification information of all the MCCHs in the MBSFN cell,
   wherein the UE is the one that is in RRC_IDLE status or RRC_CONNECTED status; the UE is the one that is receiving an MBMS service or the one that is interested in receiving an MBMS service,
   the UE determining whether there is a correspondence relationship between the required MBMS service and the MCCHs; wherein the MBSFN cell includes more than two MCCHs and, the MBSFN cell is located in an area where more than two MBSFN areas are overlapped; the UE further obtains a correspondence relationship between an MBMS service and the MCCHs according to at least one of received Electronic Service Guide (ESG), MCCH information, short message, multimedia message, system message, Radio Resource Control (RRC) information and MCCH notification information, and further determines whether the required MBMS service has a corresponding MCCH.

2. The monitoring method according to claim 1, when the UE determines that there is a correspondence relationship between the required MBMS service and the MCCHs, the method further comprising:
   when the UE determines that the MCCH changes according to the notification information of the monitored MCCH, reading information in the changed MCCH and obtaining configuration information of the required MBMS service.

3. The monitoring method according to claim 2, wherein the UE determining that an MCCH changes according to the notification information of the monitored MCCH is:
   the UE detects MCCH notification information on an MBSFN subframe indicated by a system message and determines that when contents of downlink control information (DCI) of the MCCH notification information change, the MCCH corresponding to the MCCH notification information changes.

4. The monitoring method according to claim 1, when the UE determines that there is no correspondence relationship between the required MBMS service and the MCCHs, the method further comprising:
   when the UE determines that an MCCH changes according to the notification information of the monitored MCCHs, reading information in the changed MCCH, and determining whether the required MBMS service is included, if it is included, obtaining configuration information of the required MBMS service.

5. The monitoring method according to claim 4, wherein the UE determining that an MCCH changes according to the notification information of the monitored MCCH is:
   the UE detects MCCH notification information on an MBSFN subframe indicated by a system message and determines that when contents of downlink control information (DCI) of the MCCH notification information change, the MCCH corresponding to the MCCH notification information changes.

6. A device for monitoring Multicast Control Channel (MCCH) notification information, comprising: a first determining unit, a first monitoring unit and a second monitoring unit, wherein,
   the first determining unit is adapted to, in a Multicast Broadcast Single Frequency Network (MBSFN) cell that includes more than two MCCHs, when determining that an MBMS service required by the UE is not started, further determine whether there is a correspondence relationship between the required MBMS service and the MCCHs, if there is, trigger the first monitoring unit, otherwise, trigger the second monitoring unit;
   the first monitoring unit is adapted to only monitor notification information of an MCCH corresponding to the required MBMS service;
   the second monitoring unit is adapted to monitor notification information of all the MCCHs in the MBSFN cell,
   wherein the UE is the one that is in RRC_IDLE status or RRC_CONNECTED status; the UE is the one that is receiving an MBMS service or the one that is interested in receiving an MBMS service, wherein the MBSFN cell includes more than two MCCHs and, the MBSFN cell is located in an area where more than two MBSFN areas are overlapped; the first determining unit obtains the correspondence relationship between an MBMS service and the MCCHs according to at least one of ESG, MCCH information, short message, multimedia message, system message, RRC information and MCCH notification information received by the UE, and further determines whether the required MBMS service has a corresponding MCCH.

7. The monitoring device according to claim 6, further comprising a second determining unit, a first reading unit and a first obtaining unit, wherein,
   the second determining unit is adapted to trigger the first reading unit when determining that the MCCH changes according to the notification information of the MCCH monitored by the first monitoring unit;
   the first reading unit is adapted to read information in the changed MCCH;
   the first obtaining unit is adapted to obtain configuration information of the required MBMS service from the information in the changed MCCH.

8. The monitoring device according to claim 7, wherein the second determining unit or the third determining unit detects MCCH notification information on an MBSFN subframe indicated by a system message and determines that when contents of downlink control information (DCI) of the MCCH notification information change, the MCCH corresponding to the MCCH notification information changes.

9. The monitoring device according to claim 6, further comprising a third determining unit, a second reading unit, a fourth determining unit and a second obtaining unit, wherein,
   the third determining unit is adapted to trigger the second reading unit when determining that an MCCH changes according to notification information of the MCCHs monitored by the second monitoring unit;
   the second reading unit is adapted to read information in the changed MCCH;
   the fourth determining unit is adapted to determine whether the required MBMS service is included in the information in the changed MCCHs, if it is included, trigger the second obtaining unit;
   the second obtaining unit is adapted to obtain configuration information of the required MBMS service.

10. The monitoring device according to claim 9, wherein the second determining unit or the third determining unit detects MCCH notification information on an MBSFN subframe indicated by a system message and determines that when contents of downlink control information (DCI) of the MCCH notification information change, the MCCH corresponding to the MCCH notification information changes.

* * * * *